United States Patent [19]
Meier et al.

[11] Patent Number: 5,047,125
[45] Date of Patent: * Sep. 10, 1991

[54] FRACTIONATING COLUMN CONTROL APPARATUS AND METHODS

[75] Inventors: Patricia A. Meier; W. Jeff Meier, both of Ponca City, Okla.; Brent J. Woodland, Billings, Mont.

[73] Assignee: Conoco Inc., Ponca City, Okla.

[ * ] Notice: The portion of the term of this patent subsequent to Dec. 26, 2006 has been disclaimed.

[21] Appl. No.: 397,201

[22] Filed: Aug. 25, 1989

Related U.S. Application Data

[63] Continuation-in-part of Ser. No. 155,787, Feb. 16, 1988, Pat. No. 4,889,660.

[51] Int. Cl.[5] .......................... B01D 3/14; B01D 3/42
[52] U.S. Cl. .......................... 203/2; 73/64.2; 196/132; 202/160; 202/206; 203/99; 203/DIG. 18; 203/DIG. 19; 208/DIG. 1; 364/501
[58] Field of Search ................ 203/2, 3, 1, DIG. 18, 203/99, DIG. 19; 202/160, 206; 73/64.2; 196/132, 141; 208/DIG. 1; 364/501

[56] References Cited

U.S. PATENT DOCUMENTS

| | | | |
|---|---|---|---|
| 3,901,062 | 8/1975 | Lynch et al. | 73/64.2 |
| 3,964,975 | 6/1976 | Harrison et al. | 202/160 |
| 3,976,179 | 8/1976 | Harrison et al. | 203/3 |
| 3,981,793 | 9/1976 | Christie et al. | 208/DIG. 1 |
| 3,981,942 | 9/1976 | Zabransky | 208/DIG. 1 |
| 3,999,959 | 12/1976 | Bajek | 208/17 |
| 4,262,791 | 4/1981 | Lynch et al. | 196/132 |
| 4,578,151 | 3/1986 | Soderstrom, III et al. | 203/2 |
| 4,667,508 | 5/1987 | Soderstrom, III et al. | 73/64.2 |

FOREIGN PATENT DOCUMENTS

| | | | |
|---|---|---|---|
| 0661578 | 4/1963 | Canada | 203/3 |
| 0730129 | 3/1966 | Canada | 203/3 |
| 1031685 | 6/1966 | United Kingdom | 203/3 |

Primary Examiner—Virginia Manoharan
Attorney, Agent, or Firm—Cleveland R. Williams

[57] ABSTRACT

Apparatus and methods for determining the Reid Vapor Pressure of either an overhead, side draw or bottoms product stream of a fractionating column used for fractionating a multi-component hydrocarbon feed stream into an overhead product stream, a side draw product stream and a bottoms product stream are provided. The Reid Vapor Pressure of the particular product stream is determined in response to the temperature of the product stream, the vapor pressure of the product stream, the rate of flow of the bottoms product stream, the rate of flow of the overhead product stream, and/or the rate of flow of the side draw product stream without further analyses thereof. The Reid Vapor Pressure indication is used to maintain the actual Reid Vapor Pressure of the particular product stream substantially equal to the desired Reid Vapor Pressure of the particular product stream and to thereby control the quality of the desired product stream.

7 Claims, 2 Drawing Sheets

FRACTIONATING COLUMN CONTROL APPARATUS AND METHODS

This application is a continuation-in-part application of Patricia A. Meien et al., Ser. No. 07/155,787, filed Feb. 16, 1988 now U.S. Pat. No. 4,889,600.

BACKGROUND OF THE INVENTION

1. Field of the Invention

The present invention relates generally to hydrocarbon fractionation apparatus and methods. In one aspect, the invention relates to apparatus and methods for determining the Reid Vapor Pressure of one or more product streams of a fractionating column. In another aspect, the present invention relates to apparatus and methods for controlling the Reid Vapor Pressure and quality of one or more product streams of a fractionating column.

2. Description of the Prior Art

Fractionation processes wherein a multi-component hydrocarbon stream is heated and fractionated into a bottoms product stream and one or more side draw or overhead product streams are commonly employed in refining and other similar applications. In carrying out such processes, it is important to maintain product quality while operating as efficiently as possible.

The Reid Vapor Pressure of a particular product stream is the equilibrium vapor pressure of the stream at 100° F. (37.8° C.). The Reid Vapor Pressure of a product stream is directly related to the composition of the stream. For example, the Reid Vapor Pressure of a bottoms product stream is a function of the concentration of the components therein. As a result, the Reid Vapor Pressure of a particular product stream can serve as an indication of the product quality of the stream.

Changes in certain process variables associated with a fractionating column such as the feed stream flow rate, the feed stream composition, and the amount of heat provided to the column directly affect the quality and Reid Vapor Pressure of the product streams. The quality of a product stream can be controlled by detecting changes in the Reid Vapor Pressure of the stream and manipulating one or more process variables in response to the changes detected to maintain the actual Reid Vapor Pressure of the stream substantially equal to the Reid Vapor Pressure of the stream that corresponds to the quality of the stream desired.

In the past, an accurate determination of the Reid Vapor Pressure of a particular product stream typically required a complex analysis such as a chromatographic analysis of the stream. In a continuous fractionation process, it is difficult to perform such an analysis on a continuous or frequent basis. Even where it is possible to place a chromatographic or other type of analyzer on-stream, the cost and maintenance difficulties associated therewith often make it undesirable to do so.

In order to alleviate the problem, apparatus and methods have been developed for determining the actual Reid Vapor Pressure of a product stream in the absence of a chromatographic or other type of complex analysis thereof. In U.S. Pat. Nos. 4,578,151 and 4,667,508, apparatus and methods for determining the actual Reid Vapor Pressure of a mixture of hydrocarbons in response to the actual temperature and vapor pressure of the mixture are disclosed. Vapor pressure charts are used with the temperature and vapor pressure readings to make the determination.

Although apparatus and methods for determining the Reid Vapor Pressure of a product stream in response to the temperature and vapor pressure of the stream are a solution to the problem, they do not provide an accurate Reid Vapor Pressure indication in all applications. Such apparatus and methods do not provide an accurate indication of the Reid Vapor Pressure of a product stream when the Reid Vapor Pressure of the stream varies over a wide range as the fractionation process is carried out.

Thus, there is a need for improved apparatus and methods for determining the Reid Vapor Pressure of a product stream in the absence of a chromatographic or other complex analysis thereof. There is a need for such apparatus and methods that can provide an accurate indication of the actual Reid Vapor Pressure of a product stream even when the actual Reid Vapor Pressure of the stream varies over a wide range as the fractionation process is carried out.

SUMMARY OF THE INVENTION

The present invention provides apparatus and methods for determining the Reid Vapor Pressure of a first product stream of a fractionating column used for fractionating a multi-component hydrocarbon feed stream into an overhead product stream and a bottoms product stream. The apparatus comprises means for establishing a first signal representative of the actual temperature of the first product stream, wherein the first product stream is either the overhead product stream or the bottoms product stream, means for establishing a second signal representative of the actual vapor pressure of the first product stream, means for establishing a third signal representative of the actual rate of flow of the bottoms product stream, means for establishing a fourth signal representative of the actual rate of flow of the overhead product stream, and means for determining the actual Reid Vapor Pressure of the first product stream in response to the first, second, third and fourth signals.

Also provided are apparatus and methods for controlling the Reid Vapor Pressure and quality of a first product stream of a fractionating column used for fractionating a multi-component hydrocarbon feed stream into an overhead product stream and a bottoms product stream. The apparatus and/or method comprises means for establishing a first signal representative of the actual temperature of the first product stream, means for establishing second signal representative of the actual vapor pressure of the first product stream, means for establishing a third signal representative of the actual rate of flow of the bottoms product stream, means for establishing a fourth signal representative of the actual rate of flow of the overhead product stream, means for establishing a fifth signal representative of the actual Reid Vapor Pressure of the first product stream in response to the first, second, third and fourth signals, means for establishing a sixth signal representative of the desired Reid Vapor Pressure of the first product stream, means for comparing the fifth signal and the sixth signal and for establishing a seventh signal responsive to the difference between the fifth signal and the sixth signal, and means responsive to the seventh signal for varying the rate at which heat is provided to the fractionating column to maintain the actual Reid Vapor Pressure of the first product stream substantially equal to the desired Reid Vapor Pressure of the first product stream.

In a preferred embodiment, the seventh signal is scaled so as to be representative of the temperature of the first product stream required to maintain the actual Reid Vapor Pressure of the first product stream substantially equal to the desired Reid Vapor Pressure thereof. In this embodiment, the means for varying the rate at which heat is provided to the fractionating column to maintain the actual Reid Vapor Pressure of the first product stream substantially equal to the desired Reid Vapor Pressure thereof comprises means for comparing the seventh signal and the first signal and for establishing an eighth signal responsive to the difference between the seventh signal and the first signal and means responsive to the eighth signal for varying the rate at which heat is provided to the fractionating column.

Preferably, the first product stream is the bottoms product stream. The actual Reid Vapor Pressure of the first product stream is determined and the fifth signal representative of the actual Reid Vapor Pressure of the first product stream is established in response to the first, second, third and fourth signals based on the following relationship:

Equation One $$\text{Reid Vapor Pressure} = A + B\,(X^E - C(Y)) + D/Z$$

wherein:
- X equals the temperature of the bottoms product stream as represented by the first signal;
- Y equals the vapor pressure of the bottoms product stream as represented by the second signal;
- Z equals the rate of flow of the overhead product stream as represented by the fourth signal divided by the rate of flow of the bottoms product stream as represented by the third signal; and
- A, B, C, D, and E equal fitted constants.

The present invention additionally provides for apparatus and methods for determining and controlling the Reid Vapor Pressure and quality of a side draw product stream of a fractionating column used for fractionating a multi-component hydrocarbon feed stream into an overhead product stream, a side draw product stream and a bottoms product stream. The apparatus and/or method comprises means for establishing a first signal representative of the temperature of said side draw product stream, means for establishing a second signal representative of the actual vapor pressure of said side draw product stream, means for establishing a third signal representative of the rate of flow of said bottoms product stream, means for establishing a fourth signal representative of the rate of flow of said overhead product steam, means for establishing a fifth signal representative of the rate of flow of said side draw product stream, means for establishing a sixth signal representative of the actual Reid Vapor Pressure of said side product stream in response to said first, second, third, fourth and fifth signals without an analysis of said side draw product stream, means for establishing a seventh signal representative of the desired Reid Vapor Pressure of said side draw product stream, means for comparing said sixth signal and said seventh signal and establishing an eighth signal responsive to the difference between said sixth signal and seventh signal, and varying the rate at which the side draw product is withdrawn from the fractionating column in response to said eighth signal to maintain the actual Reid Vapor Pressure of said side draw product stream substantially equal to the desired Reid Vapor Pressure of said side draw product stream.

Preferably, the actual Reid Vapor Pressure of the side draw product stream is determined and the sixth signal representative of the actual Reid Vapor Pressure of the side draw product stream is established in response to the first, second, third, fourth and fifth signals based on the following relationships:

Equation Two $$\text{Reid Vapor Pressure} = A + B\,(X^G - C(Y)) + D/Z + E/U + F/V$$

wherein:
- X equals the temperature of said side draw product stream as represented by said first signal;
- Y equals the vapor pressure of said side draw product stream as represented by said second signal;
- Z equals the rate of flow of said overhead product stream as represented by said fourth signal divided by the rate of flow of said side draw product stream as represented by said fifth signal;
- U equals the rate of flow of said bottoms product stream as represented by said third signal divided by the rate of flow of said side draw product stream as represented by said fifth signal;
- V equals the sum of the rate of flows represented by said third, fourth and fifth signals divided by the rate of flow of said side draw product stream as represented by said fifth signal; and
- A, B, C, D, E, F and G equal fitted constants.

From the foregoing description of the present invention, it will be apparent that an important object of the invention is to provide hydrocarbon fractionation apparatus and methods whereby improved control of the Reid Vapor Pressure and quality of one or more product streams is achieved.

A further object of the present invention is to provide improved methods and apparatus for determining the Reid Vapor Pressure of a product stream of a fractionating column in the absence of a chromatographic or other complex analysis thereof.

A further object is to provide improved methods and apparatus for controlling the Reid Vapor Pressure and quality of a product stream whereby an accurate indication of the Reid Vapor Pressure of the stream is provided even when the Reid Vapor Pressure of the stream varies substantially as the process is carried out.

Numerous other objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

The present invention provides apparatus and methods for determining the Reid Vapor Pressure of a first product stream of a fractionating column used for fractionating a multi-component hydrocarbon feed stream into an overhead product stream and a bottoms product stream. The first product stream can be either the overhead product stream or the bottoms product stream, preferably the bottoms product stream. First, second, third and fourth signals representative of the actual temperature of the first product stream, the actual vapor pressure of the first product stream, the actual rate of flow of the bottoms product stream, and the actual rate of flow of the overhead product stream, respectively, are established, and the Reid Vapor Pressure of the first product stream is determined in response thereto. The Reid Vapor Pressure indication can then be used to control one or more aspects of the fractionation process.

The present invention also provides apparatus and methods for controlling the Reid Vapor Pressure and quality of a first product stream of a fractionating column used for fractionating a multi-component hydrocarbon feed stream into an overhead product stream and a bottoms product stream. First, second, third and fourth signals representative of the actual temperature of the first product stream, the actual vapor pressure of the first product stream, the actual rate of flow of the bottoms product steam and the actual rate of flow of the overhead product stream, respectively, are established. A fifth signal representative of the actual Reid Vapor Pressure of the first product stream is established in response to the first, second, third and fourth signals. A sixth signal representative of the desired Reid Vapor Pressure of the first product steam is established, the fifth signal and the sixth signal are compared and a seventh signal responsive of the difference between the fifth signal and the sixth signal is established. The rate at which heat is provided to the fractionating column is varied in response to the seventh signal to maintain the actual Reid Vapor Pressure of the first product stream substantially equal to the desired Reid Vapor Pressure of the first product stream.

Preferably, the seventh signal is scaled so as to be representative of the temperature of the first product stream required to maintain the actual Reid Vapor Pressure of the first product stream substantially equal to the desired Reid Vapor Pressure thereof. The rate at which heat is provided to the fractionating column in response to the seventh signal to maintain the actual Reid Vapor Pressure of the first product stream substantially equal to the desired Reid Vapor Pressure thereof is varied by comparing the scaled seventh signal and the first signal, by establishing an eighth signal responsive to the difference between the scaled seventh signal and the first signal and by varying the rate at which heat is provided to the fractionating column in response to the eighth signal.

The Reid Vapor Pressure of the first product stream is determined and the fifth signal representative thereof is established in response to the first, second, third and fourth signals without further analyses of the stream Thus, a chromatographic or other complex analysis of the stream is not required.

The first product stream can be any product steam of the fractionating column, including the bottoms product stream, the overhead product stream or a side draw product stream. Preferably, the first product stream is the bottoms product stream. Accurate control of most fractionation processes is best achieved by controlling the Reid Vapor Pressure and quality of the bottoms product stream.

Preferably, the actual Reid Vapor Pressure of the bottoms product stream is determined and the fifth signal representative of the actual Reid Vapor Pressure of the bottoms product stream is established in response to the first, second, third and fourth signals based on the relationship shown by Equation One below:

$$\text{Reid Vapor Pressure} = A + B(X^E - C(Y)) + D/Z \quad \text{EQ (1)}$$

wherein:
X equals the temperature of the bottoms product stream as represented by the first signal;
Y equals the vapor pressure of the bottoms product stream as represented by the second signal;
Z equals the rate of flow of the overhead product stream as represented by the fourth signal divided by the rate of flow of the bottoms product stream as represented by the third signal; and
A, B, C, D, and E equal fitted constants.

The constants A, B, C, D and E usually vary depending upon the composition of the hydrocarbon feed stream and the nature of the fractionation process. They can be derived by empirical methods. For example, the constants can be derived by a multiple regression analysis of data collected on the temperature, vapor pressure and rate of flow of the bottoms product stream and the rate of flow of the overhead product stream as the fractionation process is carried out and data collected on the corresponding Reid Vapor Pressure of the bottoms product stream as determined by analysis in the laboratory. The constants can also be derived by a multiple regression analysis of data collected from a thermodynamic model of the fractionating column.

The relationship shown by Equation One above can be modified to account for other process variables. For example, if side draw product streams are withdrawn from the fractionating column, it may be desirable to add variables for the rates of flow of such streams and additional fitted constants to the equation.

The present invention additionally provides for apparatus and methods for determining and controlling the Reid Vapor Pressure and quality of a side draw product stream of a fractionating column used for fractionating a multi-component hydrocarbon feed stream into an overhead product stream, a side draw product stream and a bottoms product stream. The apparatus and/or method comprises means for establishing a first signal representative of the temperature of said side draw product stream, means for establishing a second signal representative of the actual vapor pressure of said side draw product stream, means for establishing a third signal representative of the rate of flow of said bottoms product stream, means for establishing a fourth signal representative of the rate of flow of said overhead product steam, means for establishing a fifth signal representative of the rate of flow of said side draw product stream, means for establishing a sixth signal representative of the actual Reid Vapor Pressure of said side product stream in response to said first, second, third, fourth and fifth signals without an analysis of said side draw product stream, means for establishing a seventh signal representative of the desired Reid Vapor Pressure of said side draw product stream, means for comparing said sixth signal and said seventh signal and establishing an eighth signal responsive to the difference between said sixth signal and seventh signal, and varying the rate at which the side draw product is withdrawn from the fractionating column in response to said eighth signal to maintain the actual Reid Vapor Pressure of said side draw product stream substantially equal to the desired Reid Vapor Pressure of said side draw product stream.

Preferably, the actual Reid Vapor Pressure of the side draw product stream is determined and the sixth signal representative of the actual Reid Vapor Pressure of the side draw product stream is established in response to the first, second, third, fourth and fifth signals based on the following relationships:

$$\text{Reid Vapor Pressure} = A + B$$
$$(X^G - C(Y)) + D/Z + E/U + F/V$$

wherein:

X equals the temperature of said side draw product stream as represented by said first signal;

Y equals the vapor pressure of said side draw product stream as represented by said second signal;

Z equals the rate of flow of said overhead product stream as represented by said fourth signal divided by the rate of flow of said side draw product stream as represented by said fifth signal;

U equals the rate of flow of said bottoms product stream as represented by said third signal divided by the rate of flow of said side draw product stream as represented by said fifth signal;

V equals the sum of the rate of flows represented by said third, fourth and fifth signals divided by the rate of flow of said side draw product stream as represented by said fifth signal; and A, B, C, D, E, F and G equal fitted constants.

The eighth signal is scaled so as to be representative of the temperature of said side draw product stream required to maintain said actual Reid Vapor Pressure of said side draw product stream substantially equal to said desired Reid Vapor Pressure thereof and the rate at which the side draw product is withdrawn from the fractionating column in response to said eighth signal to maintain the actual Reid Vapor Pressure of said side draw product stream substantially equal to the desired Reid Vapor Pressure thereof is varied by comparing said eighth signal and said first signal, by establishing a ninth signal responsive to the difference between said eighth signal and said first signal and by varying the rate at which the side draw product is withdrawn from said fractionating column in response to said ninth signal.

The signals referred to herein and in the claims appendant hereto as representative of measured process parameters, desired process parameters or determined values bear a direct relationship to the measured parameters, desired parameters or determined values they represent. The specific measured or desired parameters or determined values can be readily retrieved from the signals representative thereof regardless of the exact relationship therebetween.

Although the present invention applies to all types of hydrocarbon fractionation processes, it is particularly applicable to fractional distillation processes. It is not limited to any specific means for using the temperature and pressure of a first product stream or a side draw product stream and the flow rates of the overhead, side draw and bottoms product streams to determine the Reid Vapor Pressure of the first product stream, including the overhead and bottoms product streams and/or side draw product stream, or to any specific means for using the determined Reid Vapor Pressure of the respective product stream to control the Reid Vapor Pressure and quality of said respective product stream. A fractional distillation process and means for using process parameters to determine the Reid Vapor Pressure of a product stream and for using the Reid Vapor Pressure indication to control the Reid Vapor Pressure of the distillation product are generally described in U.S. Pat. Nos. 4,578,151 and 4,667,508, which are incorporated by references herein.

Figure 1:
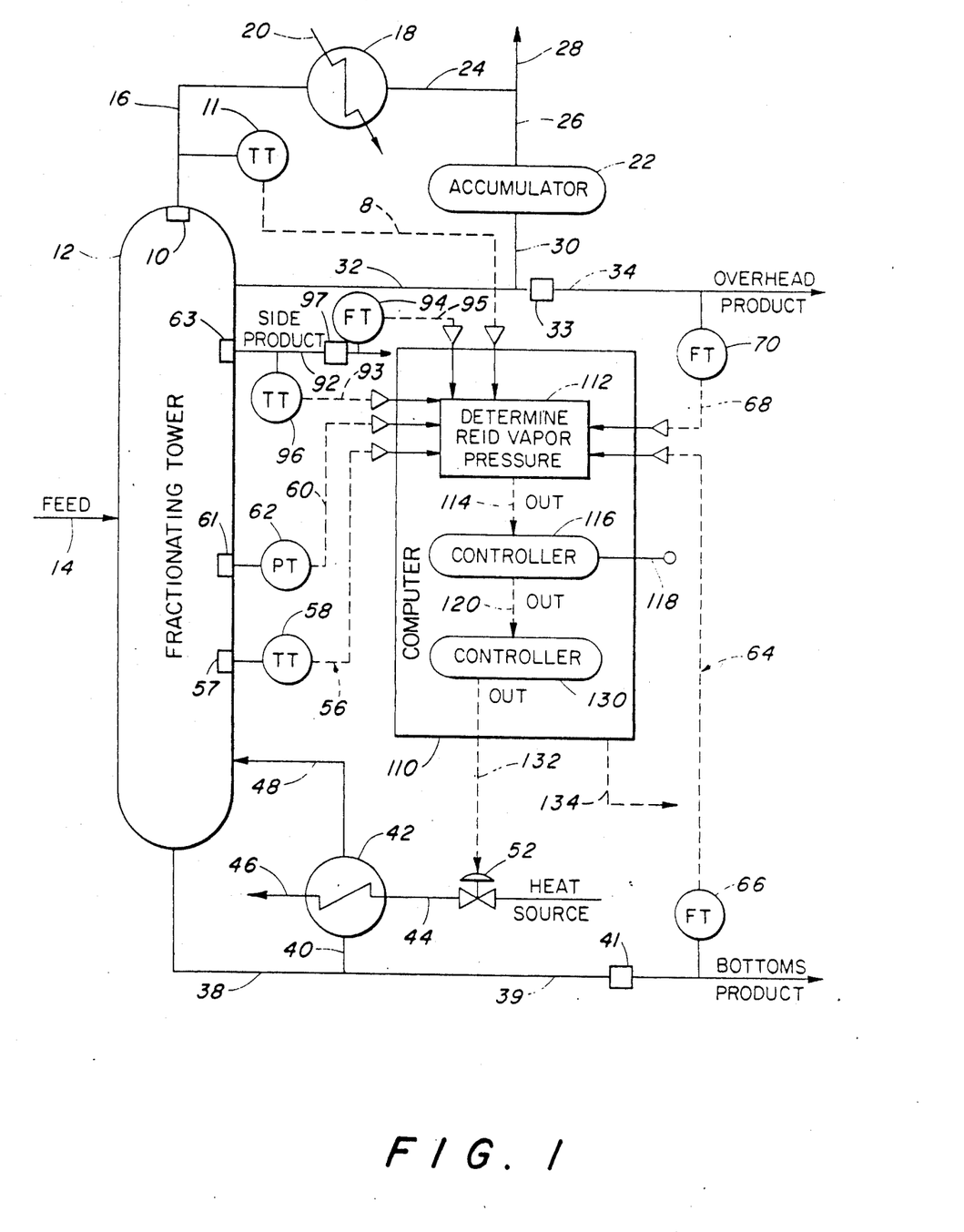
FIG. 1 is a schematic diagram of a fractional distillation process including the fractionating column control apparatus of the present invention.

Referring now to FIG. 1 of the drawings, preferred apparatus and methods for determining the Reid Vapor Pressure of the bottoms product streams of a fractionating column and for controlling the Reid Vapor Pressure and quality of the bottoms produce streams of a fractionating column will be described.

A fractional distillation column 12 is used to fractionate a multi-component hydrocarbon stream into an overhead product stream, a side draw and a bottoms product stream. The multi-component hydrocarbon stream is formed from a mixture of hydrocarbons and fed into the fractional distillation column 12 through conduit means 14. Any means for forming the mixture of hydrocarbons into the multi-component hydrocarbon stream and supplying the stream to the conduit means 14 can be used.

The overhead product stream is withdrawn from the fractional distillation column 12 through conduit means 16 and is conducted to a heat exchanger 18. Heat is exchanged between the overhead product stream and a cooling medium provided to the heat exchanger 18 through conduit means 20. The condensed overhead product stream is then conducted to an accumulator 22 through conduit means 24 and conduit means 26. If desired, vapor can be drawn off through conduit means 28. Liquid in the accumulator 22 is withdrawn from the accumulator and provided as a reflux to the fractional distillation column 12 through conduit means 30 and conduit means 32. The overhead product stream is conducted through conduit means 30 and conduit means 34. Similarly, the side draw stream is withdrawn from distillation column 12 through conduit means 92.

The bottoms product stream is withdrawn from the fractional distillation column 12 through conduit means 38 and conduit means 39. Although any means for providing heat to the fractional distillation column 12 can be used, heat is preferably provided to the column by indirect heat exchange therewith. A portion of the bottoms product stream is preferably conducted through conduit means 40 to a heat exchanger 42 and then back to the column 12 through conduit means 48. A hot fluid such as hot oil or steam is provided to the heat exchanger 42 through conduit means 44 and withdrawn from the heat exchanger through conduit means 46. In the heat exchanger 42, heat is exchanged between the hot fluid and the portion of the bottoms product stream circulated therethrough. The rate of flow of hot fluid circulated through the heat exchanger 42 and hence the amount of heat provided to the fractional distillation column 12 are controlled by control means in the form of a control valve 52.

Any means for establishing the first, second, third, fourth, and fifth signals representative of the temperature, vapor pressure and the flow rates of the respective product streams can be utilized. Sensing and transducing means for measuring process parameters and generating various signals representative thereof exist in a variety of forms and formats. As will be understood by those skilled in the art, the particular means used can vary depending upon the particular fractionating process including the equipment and control instrumentation used therewith, safety factors and the like.

Preferably, a first signal 56 representative of the actual temperature of the bottoms product stream is established by sensing device 57 located in the fractional distillation column and temperature transducer 58. As long as the first signal 56 is representative of the actual temperature of the bottoms product stream, the exact locations of sensing device 57 and temperature transducer 58 are not critical. The equilibrium temperature in the fractional distillation column is usually essentially equal to the temperature of the bottoms product steam. If necessary or desired, the actual temperature of the bottoms product stream can be sensed.

A second signal 60 representative of the actual vapor pressure of the bottoms product stream is established by sensing device 61 located in the fractional distillation column and a pressure transducer 62. As long as the second signal 60 is representative of the actual vapor pressure of the bottoms product stream, the exact locations of the sensing device and the pressure transducer 62 are not critical. In most fractionating processes, the vapor pressure of the fluid in the fractional distillation column, or even that of the overhead product stream, is essentially equal to the vapor pressure of the bottoms product stream. If necessary or desired, the vapor pressure measurement made can be adjusted or the actual vapor pressure of the bottoms product stream be be sensed.

A third signal 64 representative of the actual rate of flow of the bottoms product stream is established by flow sensor 41 located in conduit means 39 and by flow transducer 66. The exact locations of the flow sensor and flow transducer 66 are not critical as long as the third signal 64 is representative of the actual rate of flow of the bottoms product stream. If desired, the flow sensor can be located in other conduit means such as conduit means 38, conduit means 40 or conduit means 48 and the sensed value can be adjusted to be representative of the actual rate of flow of the bottoms product stream.

A fourth signal 68 representative of the actual rate of flow of the overhead product stream is established by flow sensor 33 located in conduit means 34 and a flow transducer 70. The exact locations of the flow sensor and the flow transducer 70 are not critical as long as the fourth output signal 68 is representative of the actual rate of flow of the overhead product stream. If desired, the flow sensor used to establish the fourth output signal 68 can be located in other conduit means such as conduit means 32, conduit means 30, conduit means 26, conduit means 24 or conduit means 16 and the sensed value can be adjusted to be representative of the actual rate of flow of the overhead product stream.

The output signals 56, 60, 64 and 68 are used to determine the actual Reid Vapor Pressure of the bottoms product stream. Preferably, the signals 56, 60, 64 and 68 are transmitted to and provided as input signals to computer 110 where the actual Reid Vapor Pressure of the bottoms product stream is determined. The Reid Vapor Pressure is calculated in the "Determine Reid Vapor Pressure block" 112 of the computer 110 based on the relationship described by Equation One above.

The Reid Vapor Pressure indication can be used to control one or more aspects of the fractionation process including the quality of one or more product streams. Various processes can be implemented to achieve whatever control is desired.

Preferably, the Reid Vapor Pressure determined is used to control the quality of one or more product streams by controlling the Reid Vapor Pressure of the bottoms product stream. A fifth output signal 114 representative of the actual Reid Vapor Pressure determined is established by the "Determine Reid Vapor Pressure block" 112 of the computer 110. The fifth signal is provided as a process variable input to a controller block 116. Also provided to the controller block 116 is a sixth signal 118 representative of the desired Reid Vapor Pressure for the the bottoms product stream, i.e., the Reid Vapor Pressure corresponding to the quality of the bottoms product steam desired. The sixth signal 118 serves as a set point signal. Although it can be established by any means, it is preferably entered by the operator of the fractionation process.

The controller block 116 compares the fifth signal 114 and the sixth signal 118 and establishes a seventh signal 120 which is responsive to the difference between the fifth signal 114 and the sixth signal 118. The seventh signal is then used to vary the rate at which heat is provided to the fractional distillation column to maintain the actual Reid Vapor Pressure of the bottoms product stream substantially equal to the desired Reid Vapor Pressure of the bottoms product stream.

Any means responsive to the seventh signal 120 for varying the rate at which heat is provided to the fractional distillation column 12 to maintain the actual Reid Vapor Pressure of the bottoms product stream substantially equal to the desired Reid Vapor Pressure of the bottoms product stream can be utilized.

Preferably, the seventh signal 120 is scaled so as to be representative of the temperature of the bottoms product stream required to maintain the actual Reid Vapor Pressure of the bottoms product stream substantially equal to the desired Reid Vapor Pressure of the bottoms product stream. The seventh signal 120 can be scaled by any means. Inasmuch as the scaling of an output signal is well known in the art, a detailed description of the process is not provided herein.

The scaled seventh signal 120 is provided from the controller block 116 as a set point signal to a controller block 130. Also provided to the controller block 130 is the first signal 56, which is representative of the actual temperature of the bottoms product stream. The controller block 130 compares the scaled seventh signal 120 and the first signal 56 and establishes an eighth signal 132 responsive to the difference therebetween. The rate at which heat is provided to the fractional distillation column 12 is varied in response to the eighth signal.

Any means for varying the rate at which heat is provided to the fractional distillation column 12 in response to the eighth signal can be utilized. Preferably, the control valve 52 controlling the rate of flow of heating fluid circulated through the heat exchanger 42 is manipulated in response to the eighth signal 132.

When the Reid Vapor Pressure is based on the overhead product stream, a first signal 14 representative of the actual temperature of the overhead product stream is established by temperature transducer 11 and by sensing device 10 located in fractional distillation column 12. The location of temperature transducer 11 and sensing device 10 is not critical so long as first signal 14 is representative of the actual temperature of the overhead product stream.

A second signal 60 representative of the actual vapor pressure of the overhead product stream is established by pressure transducer 62 and sensing device 61 located in fractional distillation column 12. It should be noted that sensing device 61, pressure transducer 62 and signal 60 are representative of the actual vapor pressure of the area of distillation column 12 in which it is located and more than one sensing device, pressure transducer and signal may be located in the distillation tower and connectably attached to computer 112. For example, up to three or more sensing devices, pressure transducers and signal may be strategically located to give an accurate vapor pressure of the overhead product stream, side draw product stream and bottoms product stream respectively.

A third signal 68 representative of the actual rate of flow of the overhead product stream is established by flow sensor 33 located in conduit means 32 and by flow transducer 70.

A fourth signal 64 representative of the actual rate of flow of the bottoms product stream is established by flow sensor 41 located in conduit means 39 and by flow transducer 66.

The output signals 14, 60, 64 and 68 are transmitted to and provided as input signals to computer 110 where the actual Reid Vapor Pressure of the overhead product stream is determined. The Reid Vapor pressure is calculated in the "Determine Reid Vapor Pressure block" 112 of computer 110 based upon the relationship described by Equation One above.

The Reid Vapor Pressure indication can be used to control one or more aspects of the fractionation process including the quality of one or more product streams. Various processes can be implemented to achieve whatever control is described.

Preferably, the Reid Vapor Pressure determined is used to control the quality of one or more product streams by controlling the Reid Vapor Pressure of the overhead product stream. A fifth output signal 114 representative of the actual Reid Vapor Pressure determined is established by "Determine Reid Vapor Pressure block" 112 of computer 110. The fifth signal is provided as a process variable input to controller block 116. Also provided to controller block 116 is a sixth signal 118 representative of the desired Reid Vapor Pressure for the overhead product stream, i.e., the Reid Vapor Pressure corresponding to the quality of the overhead product stream desired. The sixth signal 118 serves as a set point signal. Although the sixth signal can be established by any means, it is preferably entered by the operator of the fractional process.

The controller block 116 compares fifth signal 114 and sixth signal 118 and establishes a seventh signal 120 which is responsive to the difference between the fifth signal 114 and the sixth signal 118. The seventh signal is then used to vary the rate at which heat is provided to the fractional distillation column to maintain the actual Reid Vapor Pressure of the overhead product stream substantially equal to the desired Reid Vapor Pressure of the overhead product stream.

Any means responsive to the seventh signal 120 for varying the rate at which heat is provided to the fractional distillation column 12 to maintain the actual Reid Vapor Pressure of the bottoms product stream substantially equal to the desired Reid Vapor Pressure of the overhead product stream can be utilized.

Preferably, the seventh signal 120 is scaled so as to be representative of the temperature of the overhead product stream required to maintain the actual Reid Vapor Pressure of the overhead product stream substantially equal to the desired Reid Vapor Pressure of the overhead product stream. The seventh signal 120 can be scaled by any means. Inasmuch as the scaling of an output signal is well known in the art, a detailed description of the process is not provided herein.

The scaled seventh signal 120 is provided from the controller block 116 as a set point signal to a controller block 130. Also provided to the controller block 130 is the first signal 14, which is representative of the actual temperature of the overhead product stream. The controller block 130 compares the scaled seventh signal 120 and the first signal 14 and establishes an eighth signal 132 responsive to the difference therebetween. The rate at which heat is provided to the fractional distillation column 12 is varied in response to the eighth signal.

Alternatively, it should be noted that controller block 130 compares the scaled seventh signal 120 and the first signal 14 and establishes an eighth signal 134 responsive to the difference therebetween. The flow rate at which the overhead product stream is withdrawn from the fractional distillation column 12 is varied in response to the eighth signal.

It should additionally be noted that when the Reid Vapor Pressure is based on utilizing the flow rate of the overhead product stream from the distillation column 12, the heat to said distillation column 12 may be adjusted using conventional means, including the computer 110, an operator or signal 132 to heat adjusting means 52.

Any means for varying the rate at which heat is provided to or the flow rate of the overhead product stream from the fractional distillation column 12 in response to the eighth signal can be utilized. Preferably, the control valve 52 controlling the rate of flow of heating fluid circulated through the heat exchanger 42 is manipulated in response to the eighth signal 132 for varying the rate at which heat is provided to distillation column 12. Conventional means are used to vary the flow rate of the overhead product stream from the distillation column 12 in response to eighth signal 134.

Similarly, when the Reid Vapor Pressure is based on a side drawn product stream, a first signal 93 representative of the actual temperature of the overhead product stream is established by temperature transducer 96 located in conduit 12 and by sensing device 63 located in distillation column 12. The location of temperature transducer 96 and sensing device 63 is not critical so long as first signal 93 is representative of the actual temperature of the side draw product stream.

A second signal 60 representative of the actual vapor pressure of the side draw product stream is established by pressure transducer 62 and sensing device 61 located in fractional distillation column 12.

A third signal 64 representative of the actual rate of flow of the bottoms product stream is established by flow sensor 41 located in conduit means 39 and by flow transducer 66.

A fourth signal 68 representative of the actual rate of flow of the overhead product stream is established by flow sensor 33 located in conduit means 32 and by flow transducer 70.

A fifth signal 95 representative of the actual rate of flow of the side draw product stream is established by flow sensor 97 located in conduit means 92 and by flow transducer 94.

The output signals 60, 64, 68, 93 and 95 are transmitted to and provided as input signals to computer 110 where the actual Reid Vapor Pressure of the side draw product stream is determined. The Reid Vapor Pressure is calculated in the "Determine Reid Vapor Pressure block" 112 of computer 110 based upon the relationship described by Equation Two above.

The Reid Vapor Pressure indication can be used to control one or more aspects of the fractionation process including the quality of one or more product streams. Various processes can be implemented to achieve whatever control is desired.

A sixth output signal 114 representative of the actual Reid Vapor Pressure determined is established by "Determine Reid Vapor Pressure block" 112 of computer 110. The sixth signal is provided as a process variable input to controller block 116. Also provided to controller block 116 is a seventh signal 118 representative of the desired Reid Vapor Pressure for the side draw product stream, i.e., the Reid Vapor Pressure corresponding to the quality of the side draw product stream desired. The seventh signal 118 serves as a set point signal. Although the seventh signal can be established by any means, it is preferably entered by the operator of the fractional process.

The controller block 116 compares sixth signal 114 and seventh signal 118 and establishes an eighth signal 120 which is responsive to the difference between the sixth signal 114 and the seventh signal 118. The eighth signal is then used to vary the side draw product flow rate from the fractional distillation column to maintain the actual Reid Vapor Pressure of the side draw product stream substantially equal to the desired Reid Vapor Pressure of the side draw product stream.

Any means responsive to the eighth signal 120 for varying the rate at which the side draw product is removed from the fractional distillation column 12 to maintain the actual Reid Vapor Pressure of the side draw product stream substantially equal to the desired Reid Vapor Pressure of the side draw product stream can be utilized.

Preferably, the eighth signal 120 is scaled so as to be representative of the flow rate of the side draw product stream required to maintain the actual Reid Vapor Pressure of the side draw product stream substantially equal to the desired Reid Vapor Pressure of the side draw product stream. The eighth signal 120 can be scaled by any means. Inasmuch as the scaling of an output signal is well known in the art, a detailed description of the process is not provided herein.

The scaled eighth signal 120 is provided from the controller block 116 as a set point signal to a controller block 130. Also provided to the controller block 130 is the first signal 95, which is representative of the actual flow rate of the side draw product stream. The controller block 130 compares the scaled eighth signal 120 and the first signal 95 and establishes a ninth signal 134 responsive to the difference therebetween. The rate at which the side draw product is withdrawn from fractional distillation column 12 is varied in response to the ninth signal.

Any means for varying the rate at which the side draw product is withdrawn from said fractional distillation column 12 in response to the ninth signal can be utilized. It should be noted that when the Reid Vapor Pressure is based on utilizing the rate at which the side draw product is withdrawn from the distillation column 12, the heat to said distillation column 12 may be adjusted using conventional means including the computer 110, an operator or signal 132 to heat adjusting means 52.

It should be noted that signals 114, 118, 120, 132 and 134 are representative of signals that perform certain functions in computer 110, and as such, may perform that function for either the overhead, side draw or bottoms product streams either individually or together in computing the various response signals needed to determine and control the Reid Vapor Pressures of said various product streams.

Thus, by the present invention, the Reid Vapor Pressure of the bottoms product stream, the overhead product stream or the side draw product stream of a fractionating column can be accurately determined based on a single measurement of the temperature and vapor pressure of such steam and the rates of flow of the overhead, side draw and bottoms product streams. By continuously sensing the parameters, a continuous indication of the actual Reid Vapor Pressure of the stream is provided. Based on the continuous Reid Vapor Pressure indication, the Reid Vapor Pressure of the stream, and hence the quality of one or more product streams, can be continuously controlled. The amount of heat provided to or the flow rates of the various product streams removed from the fractional distillation column, such as the overhead, side draw or bottoms product streams, can be automatically adjusted in response to changes in the actual Reid Vapor Pressure of the stream to continuously maintain the actual Reid Vapor Pressure of the stream substantially equal to the desired Reid Vapor Pressure of the stream. The potential of this closed loop, on-stream advanced control is unlimited.

Inasmuch as accurate Reid Vapor Pressure readings are provided without a chromatographic or other complex analysis, the number of product samples sent to the lab is reduced and the efficiency of the process is improved. Maintenance problems associated with on-stream analyzers are eliminated.

By incorporating the relative product ratio into the calculation, the Reid Vapor Pressure determination is corrected for changes in separation taking place in the fractionating column. This allows accurate Reid Vapor Pressure determinations of a product stream to be made even when the actual Reid Vapor Pressure of the stream changes substantially as the fractionation process is carried out.

As mentioned above, it is generally desirable in most applications to determine the Reid Vapor Pressure of the bottoms product stream. Nevertheless, the present invention can be utilized to determine the Reid Vapor Pressure of other product streams as well. The present invention is applicable to all separation apparatus and methods whereby a stream of hydrocarbons is separated into a bottoms product stream and one or more side draw or overhead product streams.

Any means for sensing the temperature and vapor pressure of the product stream and the rates of flow of the bottoms product stream and overhead product stream can be used. Similarly, any means for using the sensed parameters to determine the Reid Vapor Pressure of the bottoms or other product stream in the absence of a chromatographic or further analysis thereof may be used. A variety of suitable components can be substituted for the specific components illustrated herein. It may be desirable to perform quality checks on the calculation input variables and controller programming logic to prevent faulty control excursions due to bad input data.

The present invention is useful for all types of separation processes. For the sake of simplicity, the many details surrounding a fractional distillation process have not been described.

In order to illustrate and facilitate a clear understanding of the invention, the following example is given:

EXAMPLE I

The fractionating column control apparatus and methods of the present invention are tested for accuracy.

The fractional distillation column 12 schematically illustrated in FIG. 1 of the drawings was used to fractionate a multi-component hydrocarbon feed stream into an overhead product stream and a bottoms product stream. The multi-component hydrocarbon feed stream consisted essentially of aliphatic and aromatic hydrocarbons.

Heat was provided to the distillation column 12 by exchanging heat between heavy cycle oil flowing through the heat exchanger 42 and the portion of the bottoms product stream flowing through the heat exchanger and recirculated to the column. The overhead product stream withdrawn from the column 12 consisted essentially of propanes, propenes, butanes, and butenes. The bottoms product stream withdrawn from the column 12 consisted essentially of butanes, butenes, pentanes, isopentene, hexanes, and slightly heavier hydrocarbons of similar nature.

As the process was carried out, the Reid Vapor Pressure of the bottoms product stream was continuously determined by the computer 110 based on the following relationship:

Reid Vapor Pressure $= A + B (X^E - C(Y)) + C/Z$ wherein:
X equals the temperature of the bottoms product stream;
Y equals the vapor pressure of the bottoms product stream;
Z equals the rate of flow of the overhead products stream divided by the rate of flow of the bottoms product stream; and
A, B, C, D, and E equal fitted constants.

Before full operation of the process began, the constants were empirically fit for the process. First the constants were determined by a multiple regression analysis of data collected from a thermodynamic model of the fractionating column. The constants were then recalculated by a multiple regression analysis of data collected on the temperature, vapor pressure, and rate of flow of the bottoms product stream and the rate of flow of the overhead product stream as the fractionation process was carried out and data collected on the corresponding Reid Vapor Pressure of the bottoms product stream as determined by analysis in the laboratory. The constants were determined to be as follows:

$A = 33.50$ $B = 0.12$ $C = 0.72$ $D = 0.52$ $E = 1.00$

Once the constants were fit for the process, full operation of the process began. A set point corresponding to the desired Reid Vapor Pressure was entered into the computer 110 by the process operator. The computer 110 continuously determined the actual Reid Vapor Pressure of the bottoms product stream as the process was carried out. The actual Reid Vapor Pressure of the bottoms product stream was recorded by the computer 110 every 60 seconds.

The computer 110 continuously compared the actual Reid Vapor Pressure of the bottoms product stream to the operator entered set point corresponding to the desired Reid Vapor Pressure thereof and continuously provided a signal which was used to vary the rate of flow of heavy cycle oil through the heat exchanger 42 to maintain the actual Reid Vapor Pressure of the bottoms product stream substantially equal to the desired Reid Vapor Pressure of the bottoms product stream. In this way, the Reid Vapor Pressure and hence the quality of the bottoms product stream was controlled.

In order to determine the accuracy of the process, the Reid Vapor Pressure of the bottoms product stream as determined by the computer 110 was compared from time to time to the Reid Vapor Pressure of the bottoms product stream as determined by a laboratory analysis. Samples of the bottoms product steam were taken and analyzed in the lab approximately four times a day throughout a forty-three day test period. In the lab, the Reid Vapor Pressure of the samples was determined by an automatic Reid Vapor Pressure analyzer. The Reid Vapor Pressure values recorded by the computer 110 at time corresponding to the times the samples were taken were collected. The Reid Vapor Pressure of each sample was then compared to the Reid Vapor Pressure of the bottoms product stream determined by the computer 110 at the time the sample was taken.

Figure 2:
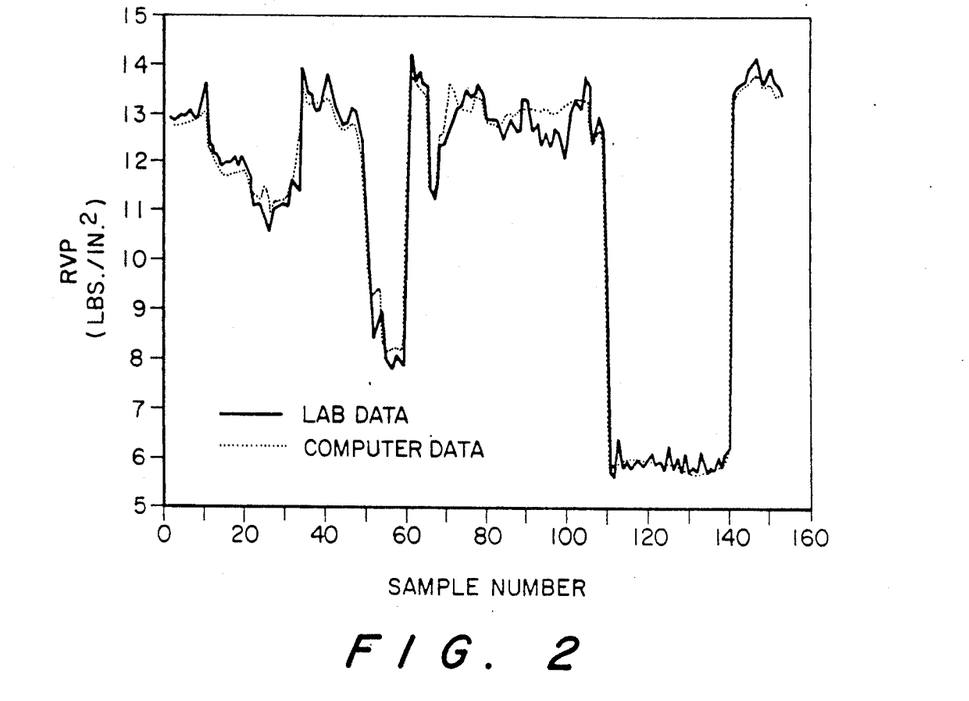
FIG. 2 is a graph showing the results of a test of the fractionating column control apparatus and methods of the present invention.
Figure 3:
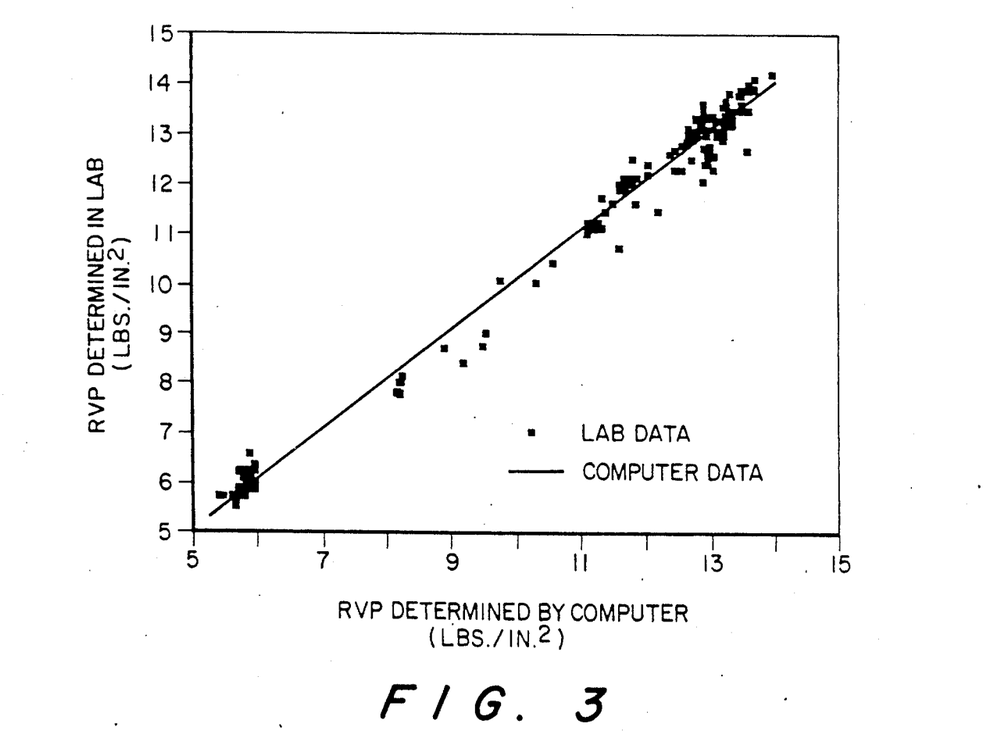
FIG. 3 is a graph showing the results shown in FIG. 2 in a different way.

The results of the comparison are plotted in the graphs shown in FIGS. 2 and 3 of the drawings. In the graph shown in FIG. 2, the Reid Vapor Pressure of each sample as determined in the lab is directly compared to the Reid Vapor Pressure of the bottoms product stream as determined by the computer 110 at the time the sample was taken. In the graph shown in FIG. 3, the Reid Vapor Pressure of each sample as determined in the lab is plotted against the Reid Vapor Pressure of the bottoms product stream as determined by the computer 110 at the time the sample was taken.

As shown by the result, the Reid vapor Pressures calculated by the computer 110 trended very well with the Reid Vapor Pressures determined in the lab. The Reid Vapor Pressure indications provided by the computer remained accurate even though the Reid Vapor Pressure of the bottoms product stream fluctuated between around 6 psi and around 14 psi. The calculated data yielded a standard deviation of ±0.34 psi from the lab data over the full Reid Vapor Pressure range.

Thus, the fractionating column control apparatus and methods of the present invention provide a very accurate continuous indication of the Reid Vapor Pressure of the bottoms product stream of a fractional distillation column, even when the Reid Vapor Pressure varies over a wide range.

From the above, it can be seen that the fractionating control apparatus and methods of the present invention can be utilized to control the quality of one or more product streams of a fractionating column. The apparatus and methods of the present invention readily achieve the ends and advantages mentioned as well as those inherent therein. While certain preferred embodiments of the apparatus and methods have been illustrated and described for the purposes of the present disclosure, numerous changes in the arrangement of parts and exact manner of performance of the various steps may be made by those skilled in the art, which changes are encompassed within the scope and spirit of the invention as defined by the appendant claims.

It should be noted that the Reid Vapor Pressure of an overhead product stream, as well as a side draw product stream can be determined and controlled by substantially utilizing the method and process for detouring the above Reid Vapor Pressure of the bottoms product stream.

The embodiments of the the invention to which an exclusive property or privilege is claimed are as follows:

1. A method of separating different products from a multi-component hydrocarbon stream whereby said stream is fed into a fractionating column, heat is provided to said column and said stream is fractionated into an overhead product stream and a bottoms product stream, wherein the improvement comprises controlling the Reid Vapor Pressure and quality of said overhead product stream comprising:

establishing a first signal representative of the temperature of said overhead product stream;

establishing a second signal representative of the vapor pressure of said overhead product stream;

establishing a third signal representative of the rate of flow of said overhead product stream;

establishing a fourth signal representative of the rate of flow of said bottoms product stream;

establishing a fifth signal representative of the actual Reid Vapor Pressure of said overhead product stream in response to said first, second, third and fourth signals without an analysis of said overhead product stream based on the following relationships:

Reid Vapor Pressure $= A + B\ (X^E - C(Y)) + D/Z$
wherein:

X equals the temperature of said overhead product stream as represented by said first signal;

Y equals the vapor pressure of said overhead product stream as represented by said second signal;

Z equals the rate of flow of said bottoms product stream as represented by said fourth signal divided by the rate of flow of said overhead product stream as represented by said third signal; and A, B, C, D and E are equal fitted constants;

establishing a sixth signal representative of the desired Reid Vapor Pressure of said overhead product stream;

comparing said fifth signal and said sixth signal and establishing a seventh signal responsive to the difference between said fifth signal and said sixth signal; and adjusting the amount of heat provided to said fractionating column in response to said seventh signal to maintain the actual Reid Vapor Pressure of said overhead product stream substantially equal to the desired Reid Vapor Pressure of said overhead product stream.

2. The method of claim 1 wherein said seventh signal is scaled so as to be representative of the temperature of said overhead products stream required to maintain said actual Reid Vapor Pressure of said overhead product stream substantially equal to the desired Reid Vapor Pressure thereof and said step of adjusting the amount of heat provided to said fractionating column in response to said seventh signal to maintain the actual Reid Vapor Pressure of said overhead products stream substantially equal to the desired Reid Vapor Pressure thereof comprises the steps of comparing said seventh signal and said first signal, establishing an eighth signal responsive to the difference between said seventh signal and said first signal and varying the rate at which heat is provided to said fractionating column in response to said eighth signal.

3. Apparatus for separating a mixture of hydrocarbons into discrete products, comprising:

a fractionating column;

means for providing heat to said fractionating column;

means for feeding a stream of said mixture of hydrocarbons to said fractionating column whereby said stream is fractionated into an overhead product stream and a bottoms product stream; and means for controlling the Reid Vapor Pressure of said overhead product stream, including:

means for establishing a first signal representative of the actual temperature of said overhead product stream;

means for establishing a second signal representative of the actual vapor pressure of said overhead product stream;

means for establishing a third signal representative of the actual rate of flow of said overhead product stream;

means for establishing a fourth signal representative of the actual rate of flow of said bottoms product stream;

means for establishing a fifth signal representative of the actual Reid Vapor Pressure of said overhead product stream in response to said first, second, third and fourth signals without an analysis of said overhead product stream based on the following relationships:

Reid Vapor Pressure $= A + B\ (X^E - C(Y)) + D/Z$
wherein:

X equals the temperature of said overhead product stream as represented by said first signal;

Y equals the vapor pressure of said overhead product stream as represented by said second signal;

Z equals the rate of flow of said bottoms product stream as represented by said fourth signal divided by the rate of flow of said overhead product stream as represented by said third signal; and A, B, C, D and E are equal fitted constants;

means for establishing a sixth signal representative of the desired Reid Vapor Pressure of said overhead product stream;

means for comparing said fifth signal and said sixth signal and for establishing a seventh signal responsive to the difference between said fifth signal and said sixth signal; and means responsive to said seventh signal for varying the rate at which heat is provided to said fractionating column to maintain said actual Reid Vapor Pressure of said overhead product stream substantially equal to said desired Reid Vapor Pressure of said overhead product stream.

4. The apparatus of claim 3 wherein said seventh signal is scaled so as to be representative of the temperature of said overhead product stream required to maintain said actual Reid Vapor Pressure of said overhead product stream substantially equal to said desired Reid Vapor Pressure thereof and said means responsive to said seventh signal for varying the rate at which heat is provided to said fractionating column to maintain said actual Reid Vapor Pressure of said overhead product stream substantially equal to said desired Reid Vapor Pressure thereof which comprises:

means for comparing said seventh signal and said first signal and for establishing an eighth signal responsive to the difference between said seventh signal and said first signal; and means responsive to said eighth signal for varying the rate at which heat is provided to said fractionating column.

5. A method for determining the Reid Vapor Pressure of an overhead product stream of a fractionating column used for fractionating a multi-component hydrocarbon feed stream into an overhead product stream and a bottoms product stream, comprising:

establishing a first signal representative of the temperature of said overhead product stream;

establishing a second signal representative of the vapor pressure of said overhead product stream;

establishing a third signal representative of the rate of flow of said overhead product stream;

establishing a fourth signal representative of the rate of flow of said bottoms product stream;

determining said Reid Vapor Pressure of said overhead product stream in response to said first, second, third and fourth signals without an analysis of said particular product stream based on the following relationship:

$$\text{Reid Vapor Pressure} = A + B\ (X^E - C(Y))\ D/Z$$

wherein:
X equals the temperature of said overhead product stream as represented by said first signal;
Y equals the vapor pressure of said overhead product stream as represented by said second signal;
Z equals the rate of flow of said bottoms product stream as represented by said fourth signal divided by the rate of flow of said overhead product stream as represented by said third signal; and
A, B, C, D and E are equal fitted constants.

6. In a method of separating different products from a multi-component hydrocarbon stream whereby said stream is fed into a fractionating column, heat is provided to said column and said stream is fractionated into an overhead product stream, a side draw product stream and a bottoms product stream, wherein the improvement comprises controlling the Reid Vapor Pressure and quality of said side draw product stream comprising:

establishing a first signal representative of the temperature of said side draw product stream;

establishing a second signal representative of the vapor pressure of said side draw product stream;

establishing a third signal representative of the rate of flow of said bottoms product stream;

establishing a fourth signal representative of the rate of flow of said overhead product stream;

establishing a fifth signal representative of the rate of flow of said side draw product stream;

establishing a sixth signal representative of the actual Reid Vapor Pressure of said side draw product stream in response to said first, second, third, fourth and fifth signals based on the following relationship:

$$\text{Reid Vapor Pressure} = A + B\ (X^E - C(Y)) + D/Z + E/U + F/V$$

wherein:
X equals the temperature of said side draw product stream as represented by said first signal;
Y equals the vapor pressure of said side draw product stream as represented by said second signal;
Z equals the rate of flow of said overhead product stream as represented by said fourth signal divided by the rate of flow of said side draw product stream as represented by said fifth signal; and
U equals the rate of flow of said bottoms product stream as represented by said third signal divided by the rate of flow of said side draw product stream as represented by said fifth signal;
V equals the sum of the rate of flows represented by said third, fourth, and fifth signals divided by the rate of flow of said side draw product stream as represented by said fifth signal; and
A, B, C, D, E, F and G are equal fitted constants;
establishing a seventh signal representative of the desired Reid Vapor Pressure of said side draw product stream;
comparing said sixth signal and said seventh signal and establishing a eighth signal responsive to the difference between said sixth signal and said seventh signal; and
adjusting the rate of flow at which the side draw product is drawn from said fractionating column in response to said eight signal to maintain the actual Reid Vapor Pressure of said side draw product stream substantially equal to the desired Reid Vapor Pressure of said side draw product stream.

7. The method of claim 6 wherein said eighth signal is scaled so as to be representative of the temperature of said side draw product stream required to maintain said actual Reid Vapor Pressure of said side product stream substantially equal to said desired Reid Vapor Pressure thereof and the flow rate at which the side draw product is withdrawn from said fractionating column in response to said eighth signal to maintain the actual Reid Vapor Pressure of said side draw product stream substantially equal to the desired Reid Vapor Pressure thereof by comparing said eighth signal and said first signal, by establishing a ninth signal responsive to the difference between said eighth signal and said first signal and by varying the rate at which the side draw product is withdrawn from said fractionating column in response to said ninth signal.

* * * * *